United States Patent [19]

Menzel

[11] Patent Number: 5,031,747
[45] Date of Patent: Jul. 16, 1991

[54] GUIDE FOR STACKS OF DISK-SHAPED ELEMENTS

[75] Inventor: Karl-Heinz Menzel, Braunschweig, Fed. Rep. of Germany

[73] Assignee: Schmalbach-Lubeca AG, Braunschweig, Fed. Rep. of Germany

[21] Appl. No.: 477,257

[22] Filed: Feb. 7, 1990

[30] Foreign Application Priority Data

Feb. 9, 1989 [DE] Fed. Rep. of Germany ....... 3903816

[51] Int. Cl.⁵ .............................................. B65G 11/00
[52] U.S. Cl. ............................. 193/2 R; 193/DIG. 1
[58] Field of Search ........................ 193/2 R, 33, 34; 221/273, 274

[56] References Cited

U.S. PATENT DOCUMENTS

| | | | |
|---|---|---|---|
| 1,475,585 | 11/1923 | King | 193/DIG. 1 |
| 1,981,565 | 11/1934 | Namur | 221/273 X |
| 2,523,089 | 9/1950 | Block | 193/2 R |
| 3,651,910 | 3/1972 | Buschbom | 193/34 X |

Primary Examiner—Joseph E. Valenza
Assistant Examiner—Keith L. Dixon
Attorney, Agent, or Firm—Herbert Dubno; Juri Kateschov

[57] ABSTRACT

A guide for a stack of disk-shaped elements, especially sheet metal can lids has an extruded bar formed unitarily with a hollow longitudinal guide segment having a cylindrical inner guide surface enclosing a channel in which the stack is guided and a hollow longitudinal supporting and connecting segment of box-shaped cross section connected to the guide segment and extending along the guide segment to support the guide segment.

14 Claims, 3 Drawing Sheets

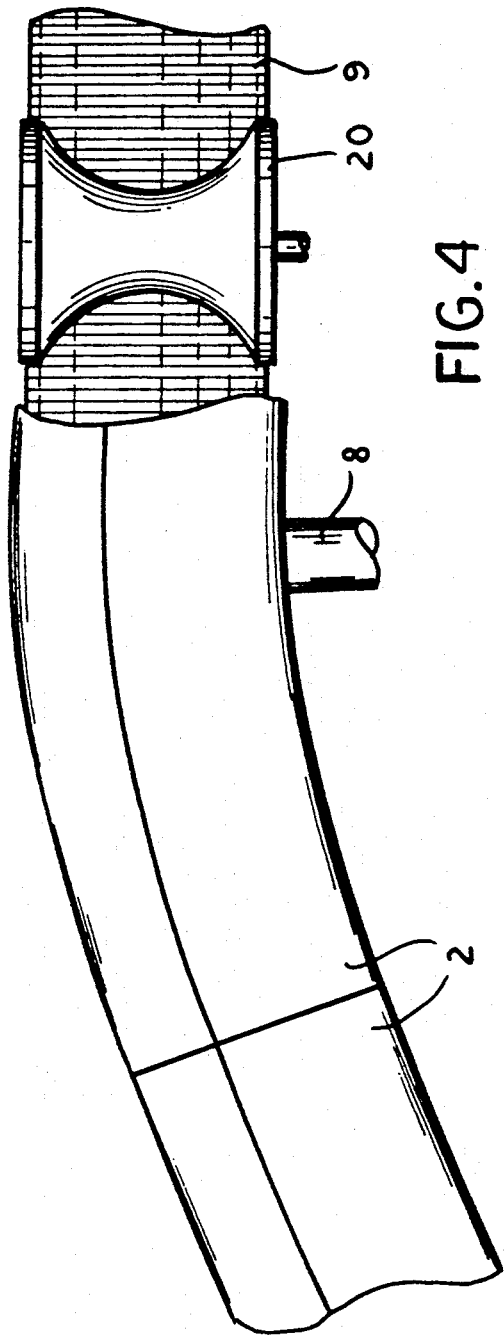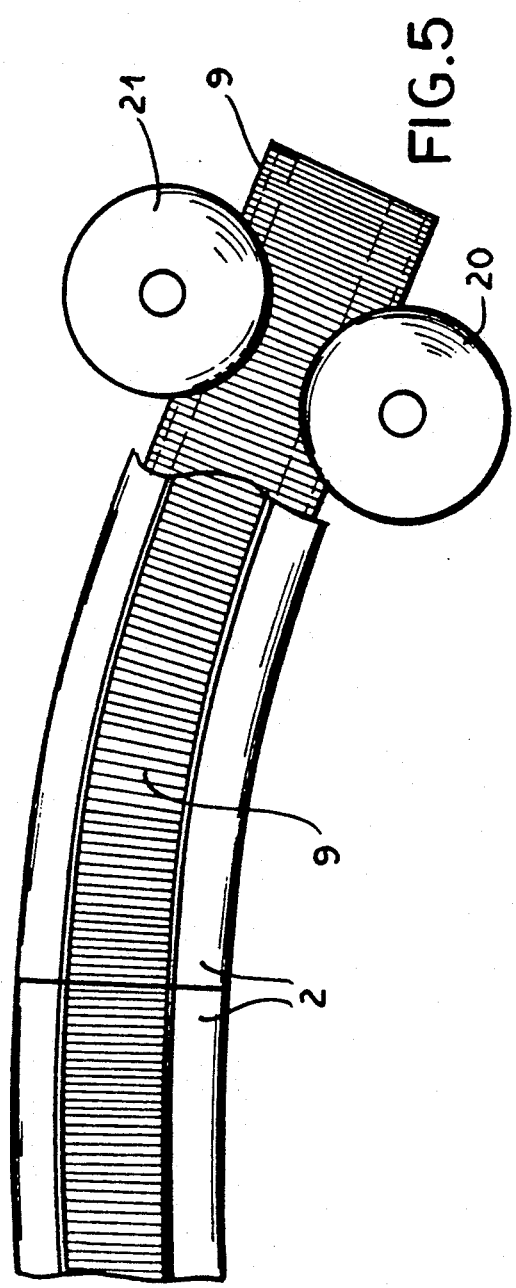

GUIDE FOR STACKS OF DISK-SHAPED ELEMENTS

FIELD OF THE INVENTION

My present invention relates to a guide for a stack of disk-shaped elements and especially for sheet metal disks which may be used as the closures of containers, especially cans and the like.

BACKGROUND OF THE INVENTION

Can covers are produced in the form of disks of sheet metal annually in hundreds of millions of pieces and must be handled upon manufacture for incorporation into can-closing equipment and the like in stacks.

Although can covers represent a mass-produced article, it has been necessary heretofore to provide a large number of systems for the manufacture, handling, transportation and intervening storage of the stacks of covers.

Indeed, between the fabrication of the sheet metal disk and its application to the can, there are many steps in the process which involve handling of the can cover and for the various purposes the covers have been provided, the handling, guidance and manipulation techniques have varied.

As noted, the disks are generally handled in the form of stacks, this term being utilized to refer to a multiplicity of the disks in adjacent relationship, whether the column of disks is upright, horizontal or in some other orientation, the stack being provided at the disk-fabrication site, at the container-closing site and hence in the packaging machine, and at the various treatment and storage sites therebetween.

Consequently, it is necessary to transport stacks of the sheet metal disks between these locations and, in practice, the transport paths between the various locations can exceed 100 meters in length. Because the transport path must be capable of delivering the stacks to or receiving the stacks from a variety of locations, this path is frequently curved, i.e. can have a variety of directional changes in it.

It is known, for the transport of stacks of sheet metal disk-shaped elements to provide a channel which is enclosed in an inversely-shaped shell-like cage and to hold sections of the channel together with arc-shaped transverse bars which can be individually connected to the longitudinal channel-forming bars.

This system has been found to be disadvantageous because it requires time-consuming attachment and mounting steps. It is also relatively expensive, difficult to maintain because of the time-consuming mounting and dismounting operations which are necessary, and prone to malfunction since it must be adjusted with precision.

Indeed, if precise attachment of the channel-forming member and its mounting members is not ensured, a reliable guidance of the stack through the channel cannot be guaranteed and the transport process will be fraught with jamming and interruption.

Furthermore, the disk-shaped metal elements, which are usually composed of aluminum, tend to frictionally interact with the channel walls which may be composed of the same or other materials, causing rapid wear and deterioration thereof and increasing the need for maintenance with the drawbacks enumerated above.

OBJECTS OF THE INVENTION

It is the principal object of the present invention to overcome the drawbacks of the guide arrangements previously described.

A more specific object of this invention is to provide a guide for the transport of stacks of sheet metal disk-shaped elements, especially cover disks for cans, whereby the maintenance requirements of the guide are reduced and maintenance is simplified.

Another object of this invention is to provide a low-cost guide system for sheet metal can lids which will reduce or eliminate drawbacks of earlier systems, does not require as precise adjustment of the earlier systems and, in general, can provide a more reliable transport of the cover lids between various locations from the fabrication of the lid to the application of the lid to a can in a packaging machine.

SUMMARY OF THE INVENTION

These objects and others which will become more readily apparent hereinafter are attained, in accordance with the present invention by providing a guide for stacks of disk-shaped elements, especially sheet metal can lids or the like, so that at least one longitudinally-extending profile element or a plurality of such elements in end-to-end adjoining relationship and alignment, each have in cross section a hollow profile channel-forming segment with a cylindrical inner guide surface extending around the stack and can lids by an angle or arc length in cases of 180°, and a hollow box-shaped support and connecting segment which is preferably integral, i.e. unitary and in one piece therewith.

According to a feature of the invention, the or each profile element, consisting of the two segments, is formed in one piece as an aluminum extruded stand or bar.

The bar can extend the full length of the guide, if desired, but usually is fabricated in easily handled lengths which may be 5 or more meters and can be joined end-to-end with identical bars to form transport paths for the can lid stacks which extend up to hundreds of meters as may be required. The one-piece construction, of course, simplifies mounting and alignment of the channels of the successive bars.

The guide of the invention is of very light weight and high form stability and resistance to bending because of the combination of the channel-shaped segment and the box-section segment and the construction thereof as an extruded bar of aluminum. The guide of the invention is also significantly less expensive than earlier guides.

With the aid of the hollow box-shaped support and connecting segment of the bar, the successive profile elements can easily be mounted on appropriate brackets or holders and, as required, can be dismounted easily as well. This greatly simplifies handling and maintenance.

It is not necessary to fully enclose the stack and indeed it is preferred, in accordance with the invention, to have the guide surface or wall of the container extend over an angle or arc length between 200° and 300° around the stack, preferably with an angle or arc length of about 270°.

According to another feature of the invention, the cylindrical inner surface of the channel is recessed over the greater part of its area, leaving unrecessed only a small edge region. Longitudinally along these edge regions, undercut shoulders are provided and a plate of a synthetic resin having a low friction coefficient and thus low wear is inserted so that its longitudinal edges engage below the undercut shoulders. The synthetic resin plate can be composed, for example, of polytetrafluoroethylene.

In accordance with these principles, the low-friction layer can limit the wear of the guide and, of course, the frictional interaction of the disks with the guide. The undercut shoulder arrangement in particular permits the plates to be removed and replaced with ease, especially since the friction-reducing plates are not adhesively secured to the wall of the guide bar.

According to another feature of the invention, the hollow box-shaped support and connecting segment is provided with a mounting surface which includes or is formed with a longitudinal groove or slit to receive the fastening elements which secure the bar of the brackets or holders.

It has been found, in particular, to be advantageous to have the support and connecting segment symmetrical with respect to a symmetry plane of the channel segment.

The support and connecting segment, moreover, can have at least one closed or closable suction passage or duct.

The profile element or bar of the invention can deviate from the rectilinear, downwardly, upwardly, or to one side or the other as may be required with a continuous curvature to ensure that the desired path of the stacks of cover disks will be followed by the channel. Of course this means that the channel can be inclined in any direction as well.

The hollow profile channel segment as described above provides excellent protection of the guide surface against contamination and likewise protects the cover disks from contamination while allowing the covers in the guide to be accessible from the exterior through the longitudinal slot which remains in the partially closed channel.

The channel and the support and guide element can be symmetrical with respect to a longitudinal median plane of the bar.

The box section of the support and connecting segment provides exceptionally high resistance to bending and shape stiffness of the bar.

Because of the profile or cross section of the support and connecting segment, moreover, it can provide a throughgoing duct or passage in the longitudinal direction which can be closed off toward the exterior, e.g. by plugging the longitudinal groove or slit so that this duct can be used for a variety of purposes, e.g. as a suction duct for delivering suction to the desired locations in the packaging plant.

For example, in the fabrication of the covers it is common practice to apply a sealing compound in the edge region of the cover and to effect a gel formation and drying of the compound. This can be promoted by evacuating air and vapors from the guide channel utilizing the suction duct and holes spaced therealong and communicating between the channel and the suction duct.

In this manner, it is possible to combine the transport of the covers with a stage accelerating the drying process and to eliminate free passage of noxious or toxic vapors into the work room by drawing them off utilizing the suction duct.

At the inlet end of the guide and, if necessary, at spaced locations therealong, an appropriate means is provided for advancing the stacks through the guide.

This means can include roller pairs which engage the stack between the rollers of the pair.

The driven roller pairs can have concave profiles designed to fit a cylindrical stack and engage opposite sides thereof.

Of course, the guide of the invention need not be used exclusively for cover disks but also can be employed for the transport of any disk-shaped objects to be displaced in a stack or column configuration.

More specifically, the guide of the invention comprises:

at least one elongated profile element extending along a path of the stack, the elongated profile element including:
  a hollow longitudinal guide segment formed with a cylindrical inner guide surface enclosing a channel along which the stack is guided, the guide surface in section extending around the channel and the stack through more than 180° of arc, and
  an hollow longitudinal supporting and connecting segment of box-shaped cross section connected to the guide segment and extending therealong to support the guide segment.

BRIEF DESCRIPTION OF THE DRAWING

The above and other objects, features and advantages of the present invention will become more readily apparent from the following description, reference being made to the accompanying drawing in which:

FIG. 4 is a side elevational view showing curvature and inclination of the guide in a vertical plane;

FIG. 5 is a plan view showing curvature of the guide in the horizontal plane.

SPECIFIC DESCRIPTION

Figure 1:
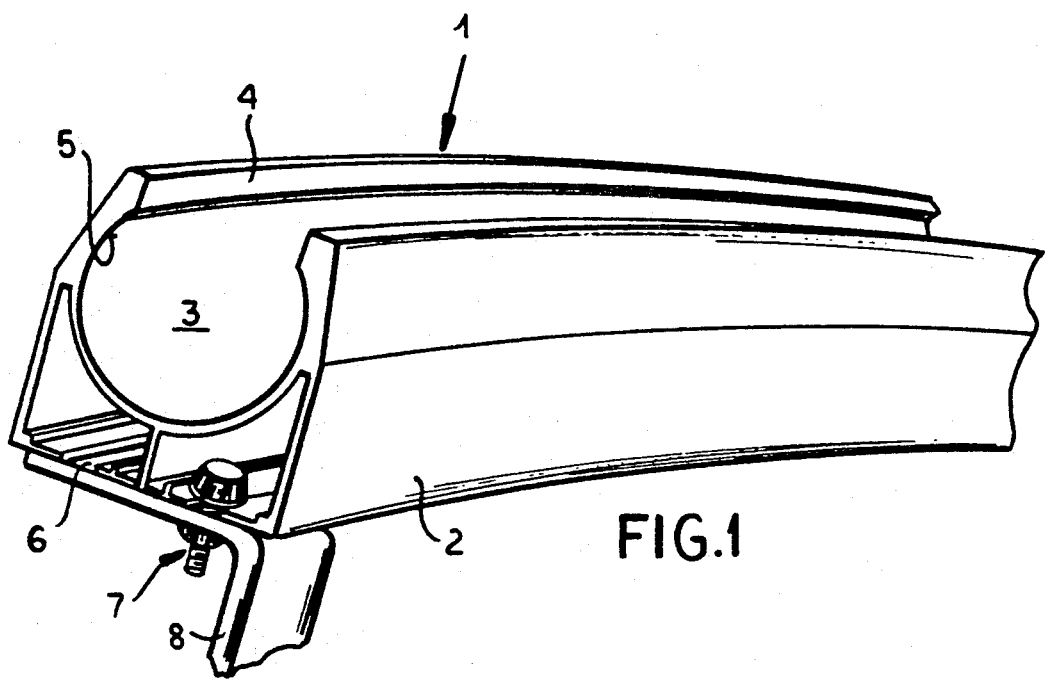
FIG. 1 is a perspective view of a profile element curved with respect to the horizontal and also inclined with respect to the horizontal and forming a guide according to the invention.
Figure 2:
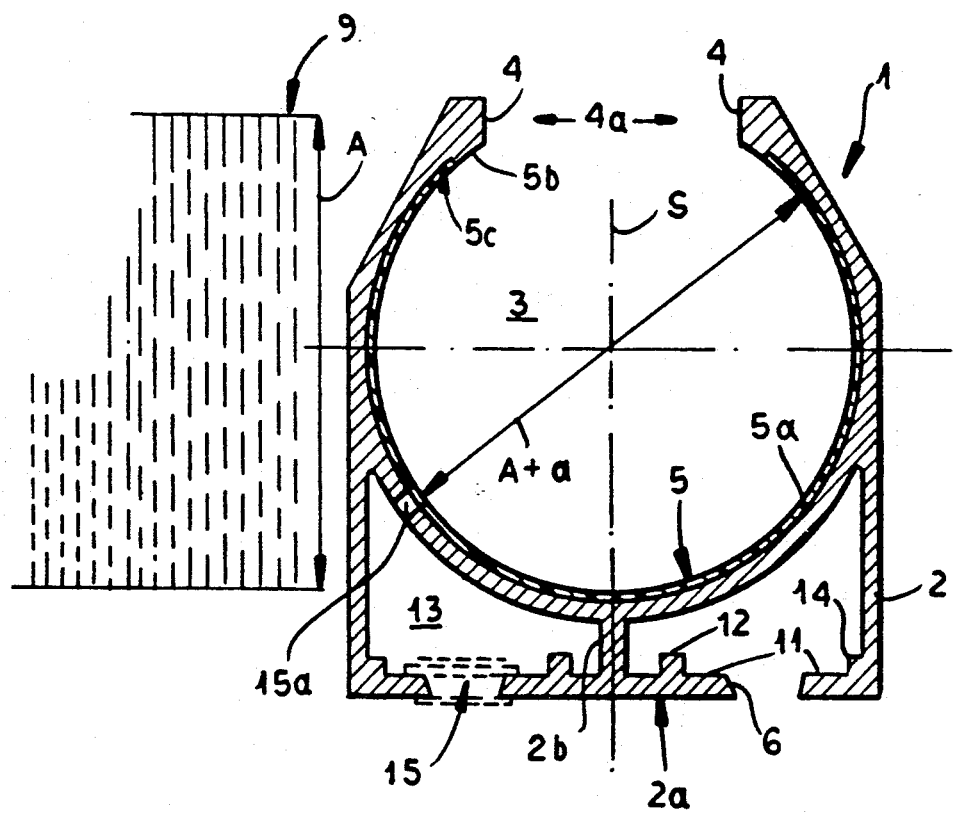
FIG. 2 is a cross sectional view through the guide bar.

The profile element illustrated in FIGS. 1 and 2 is preferably composed of aluminum and can be extruded as a bar of aluminum utilizing conventional aluminum extrusion techniques with any desired length.

The profile element or bar comprises two segments, namely, the channel segment 3 with a hollow profile and a cylindrical inner guide surface 5 which peripherally extends around the stack of disks through an angle or arc length significantly greater than 180°. In the illustrated embodiment, the guide surface 5 extends over an angle of about 270° and this angle may range preferably between 200° and 300°.

The segment 3, therefore, has a longitudinally extending peripheral slot 4a which is defined between flanks 4 of the profile. With this construction, the hollow profile segment 3 not only provides a continuous one-piece guide for the stack 9 of cover lids or the like but also provides excellent protection for the cover and the guide surface against contamination.

Figure 6:
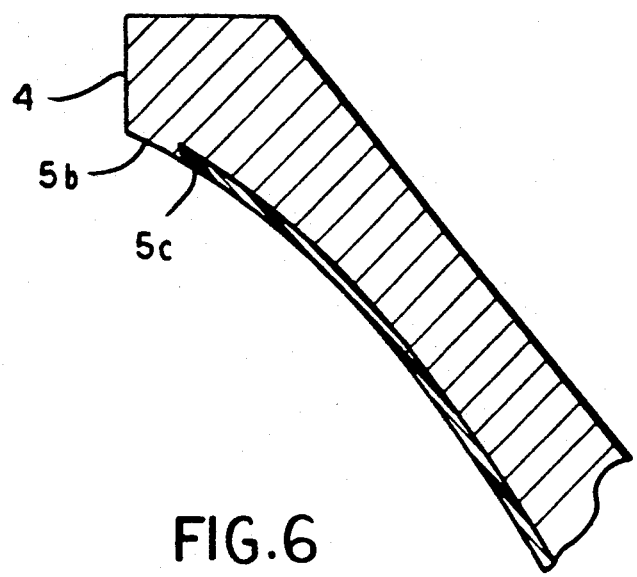
FIG. 6 is a detail section showing the undercut region and its engagement with the friction-reducing plate.

As is visible from FIG. 2 and in greater detail from FIG. 6, the guide surface 5 is recessed over the greater part of its periphery and the recess, adjacent to shanks 4 are provided with undercut shoulders 5c. The shoulders 5c are formed in strips 5b of the surface 5 extending between the recess and the shanks 4.

The recessed region of the guide surface 5 is aligned with a layer 5a of a wear and friction-reducing synthetic resin, namely, polytetrafluoroethylene, which provides the sole contact for the stack 9 of the lids.

The layer 5a is force-fitted into the recess and is held in place by the undercuts without adhesive bonding to the bar so that it can readily be replaced.

If the covers have a diameter A, the diameter of the guide surface defined by the plastic layer 5a will be slightly greater as has been illustrated by the dimension A+a for the diameter of the guide surface in FIG. 2. This dimension is selected so that the covers will reliably but with a minimum play, pass through the guide without contacting the strips 5b and without tending to cant in the guide.

The stiffness and bending resistance of the bar 1 is based upon the fact that the channel segment 3 is formed in one piece with and along side a hollow box-shaped support and connecting segment 2. This segment is provided on the side of the channel segment opposite the gap 4a and has a planar mounting surface 2a on its side opposite the channel.

From FIG. 2 it will be apparent that the profile element is of a cross section which is symmetrical with respect to a plane S which also constitutes the median plane channel and extends through the center of the gap 4a.

The support and connecting segment 2 may be provided in this lane with an internal web or rib 2b which can partition the interior of the box-shaped profile into two longitudinally extending ducts 13.

Each duct 13 is formed in the mounting plane 2a with a longitudinal slit 6 whose flanks are inclined or undercut as is clearly apparent from FIG. 2. In the interior of this segment, steps 11 and 14 and longitudinal ribs 12 can be provided to cooperate with fastening elements of the type shown at 7 in FIG. 1 to enable the bar to be mounted upon brackets or holders 8. In this manner, each profile element or bar can be readily mounted and dismounted utilizing simple screws on the brackets 8 which may be fixed on other supports (not shown).

One or the other of the two ducts 13 can be closed with respect to the exterior by a plug strip 15, for example, so as to form that duct as a suction duct. The suction duct may be connected to the interior of the channel by a throughgoing bore 15a at spaced-apart locations to allow the evacuation of air and vapor from the channel for the purposes described.

The lining 5a can be fabricated simply and inexpensively by cutting it out from a flat sheet or from a continuous strip of a synthetic resin with a thickness of about 1 mm.

The breadth of the strip thus formed should be such that the liner be held firmly against the bottom of the recess when its edges engage beneath the undercut shoulders 5c practically without play. The synthetic resin material of the liner is elastically bendable and remains in position without the need for adhesive bonding or weld sealing of the liner to the bar. This simplifies manufacture, assembly and replacement of the liner in the event of wear.

The stack 9 can be displaced through the guide with the aid of a feed arrangement provided at the undercut end of the guide and at various locations along the length thereof. An appropriate device for this purpose has been shown in FIGS. 3, 4 and 5.

The stack is here advanced between two counter-rotating rollers 20 and 21 which are driven and engage opposite sides of the stack with concave profiles of these rollers having curvatures complementary to that of the stack.

Figure 3:
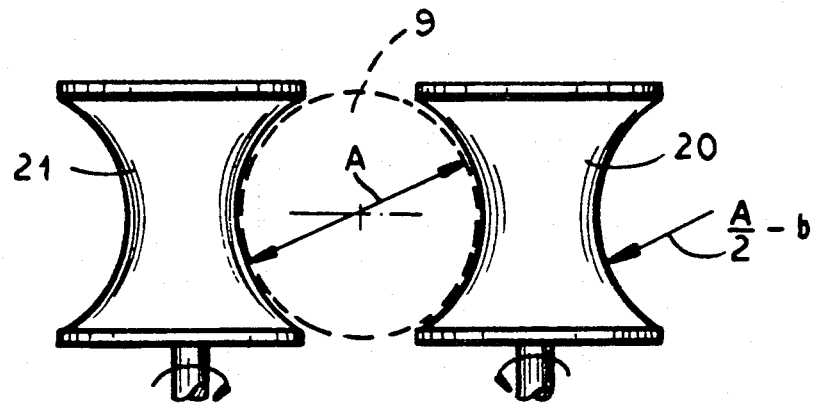
FIG. 3 is an elevational view of a pair of rollers serving to advance the stack through the guide bar.

The radius of the peripheral profiles of the rollers 20 and 21 is slightly less than ½ the diameter A of the cover or the stack as is shown in FIG. 3 for the radius A/2−b. The rollers can be composed of a synthetic resin or rubber or can have a plastic coating on their peripheries so that the advancing movement can be imparted to the lids without damaging them.

FIG. 4 shows how the rollers cooperate with the stack for a downwardly or upwardly curved guide made up of a plurality of the bars joined end-to-end.

FIG. 5 illustrates the cooperation of the rollers with a guide having two or more bars in end-to-end relationship and curved in the horizontal plane.

I claim:

1. A guide for a stack of disk-shaped elements, especially sheet-metal lids for cans, comprising:
   at least one elongated profile element extending along a path of said stack, said elongated profile element being formed in one piece and including:
   a hollow longitudinal guide segment formed with a cylindrical inner guide surface enclosing a trough forming a bottom of said guide segment, said stack being guided along said trough, said guide surface in section extending around said trough and said stack through more than 180°, and
   a hollow longitudinal supporting and connecting segment of box-shaped cross section connected to and unitary with said bottom of said guide segment and extending therealong to support said guide segment.

2. The guide defined in claim 1 wherein each of said segments constitutes a respective segment of a one-piece extruded bar.

3. The guide defined in claim 2 wherein said hollow longitudinal supporting and connecting segment is formed with a mounting surface provided with a longitudinally extending groove for receiving fastening elements.

4. The guide defined in claim 3 wherein said longitudinally extending groove is a slot traversed by said fastening elements.

5. The guide defined in claim 4 wherein said hollow longitudinal supporting and connecting segment is symmetrical with respect to a symmetry plane of said bar.

6. The guide defined in claim 2 wherein said one-piece extruded bar is composed of aluminum.

7. The guide defined in claim 2 wherein said guide surface in section extending around said trough and said stack through an angle between 200° and 300°.

8. The guide defined in claim 7 wherein said angle is about 270°.

9. The guide defined in claim 1 wherein said bar is continuously curved in at least one direction.

10. A guide for a stack of disk-shaped elements, especially sheet-metal lids for cans, comprising:
    at least one elongated profile element extending along a path of said stack, said elongated profile element including:
    a hollow longitudinal guide segment formed with a cylindrical inner guide surface enclosing a channel along which said stack is guided, said guide surface in section extending around said channel and said stack through more than 180° of arc, a hollow longitudinal supporting and connecting segment of box-shaped cross section connected to said guide segment and extending therealong to support said guide segment, each of said segments constituting a respective segment of a one-piece extruded bar, said surface being recessed over all but a small edge region thereof to form a generally cylindrical recess therein, and a synthetic-resin plate received in said recesses and held therein along longitudinal edges of said plate.

11. The guide defined in claim 10 wherein said plate is held adhesive free in said recess.

12. The guide defined in claim 10 wherein said recess is overhung by undercut shoulders along said longitudinal edges and engaging over said longitudinal edges.

13. A guide for a stack of disk-shaped elements, especially sheet-metal lids for cans, comprising:

at least one elongated profile element extending along a path of said stack, said elongated profile element including:

a hollow longitudinal guide segment formed with a cylindrical inner guide surface enclosing a channel along which said stack is guided, said guide surface in section extending around said channel and said stack through more than 180° of arc, a hollow longitudinal supporting and connecting segment of box-shaped cross section connected to said guide segment and extending therealong to support said guide segment, each of said segments constituting a respective segment of a one-piece extruded bar, and a lining on said surface engageable by said stack of a low-friction synthetic resin.

14. A guide for a stack of disk-shaped elements, especially sheet-metal lids for cans, comprising:

at least one elongated profile element extending along a path of said stack, said elongated profile element including:

a hollow longitudinal guide segment formed with a cylindrical inner guide surface enclosing a channel along which said stack is guided, said guide surface in section extending around said channel and said stack through more than 180° of arc, a hollow longitudinal supporting and connecting segment of box-shaped cross section connected to said guide segment and extending therealong to support said guide segment, said hollow longitudinal supporting and connecting segment being formed with a mounting surface provided with a longitudinally extending groove for receiving fastening elements, said longitudinally extending groove being a slot traversed by said fastening elements, said hollow longitudinal supporting and connecting segment being formed with at least one closed or closeable suction duct.

* * * * *